(12) United States Patent
Funato et al.

(10) Patent No.: US 7,545,754 B2
(45) Date of Patent: Jun. 9, 2009

(54) GEOGRAPHICALLY ADJACENT ACCESS ROUTER DISCOVERY AND CACHING FOR MOBILE NODES

(75) Inventors: Daichi Funato, Mountain View, CA (US); Carl Williams, Palo Alto, CA (US); Atsushi Takeshita, Sunnyvale, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1284 days.

(21) Appl. No.: 10/185,845

(22) Filed: Jun. 27, 2002

(65) Prior Publication Data

US 2003/0087646 A1  May 8, 2003

Related U.S. Application Data

(60) Provisional application No. 60/345,062, filed on Nov. 2, 2001.

(51) Int. Cl.
 *H04L 12/28* (2006.01)
(52) U.S. Cl. .................. 370/254; 370/331; 370/401
(58) Field of Classification Search .............. 370/254, 370/331, 401
 See application file for complete search history.

(56) References Cited

U.S. PATENT DOCUMENTS

| | | | |
|---|---|---|---|
| 5,822,313 | A | 10/1998 | Malek et al. |
| 6,088,587 | A | 7/2000 | Abbadessa |
| 6,160,804 | A | 12/2000 | Ahmed et al. |
| 7,222,188 | B1 * | 5/2007 | Ames et al. ............... 709/238 |
| 7,313,628 | B2 * | 12/2007 | Chaskar et al. ........... 709/238 |
| 2003/0031183 | A1 * | 2/2003 | Kashyap et al. .......... 370/395.2 |
| 2005/0271034 | A1 * | 12/2005 | Asokan et al. ............. 370/349 |

FOREIGN PATENT DOCUMENTS

JP    2001-258058 A    9/2001

OTHER PUBLICATIONS

Kempf, J., Funato, D., Malki, K., Gwon, Y., Pettersson, M., Roberts, P., Soliman, H., Takeshita, A., Yegin, A., "Requirements for Layer 2 Protocols to Support Optimized Handover for IP Mobility", Work in Progress, Jul. 2001.
Syed, H., Kenward, G., Calhoun, P., Nakhjiri, M., Koodli, R., Atwal, K., Smith, M., Krishnamurthi, G., "General Requirements for Context Transfer", Work in Progress,Sep. 2001.
Perkins, C., "IP Mobility Support", *RFC 2002*, Oct. 1996.

(Continued)

*Primary Examiner*—Jason E Mattis
(74) *Attorney, Agent, or Firm*—Blakely, Sokoloff, Taylor & Zafman LLP

(57) ABSTRACT

A geographically adjacent access router discovery system discovers geographically adjacent access routers through a distributed process in which mobile node(s) associated with a current access router may receive beacon signals from geographically adjacent access points. A link layer ID included in the beacon signals may be used by the system to identify corresponding geographically adjacent access routers. Network layer addresses of geographically adjacent access routers may be mapped to corresponding link layer IDs and cached by the system. The cache may be used to identify a network layer address from the link layer ID received in a beacon signal.

30 Claims, 10 Drawing Sheets

OTHER PUBLICATIONS

Johnson, D. and Perkins, C., "Mobility Support in IPv6", draft-1i5r-mobileip-ipv6-13.text, Work in Progress, Nov. 2000.

MIPv4 Handoffs Design Team, "Low Latency Handoffs in Mobile IPv4", draft-ietf-mobileip-lowlatency-handoffs-v4-00.text, Work in Progress, Feb. 2001.

MIPv6 Handoff Design Team, "Fast Handoffs for Mobile IPv6", draft-ietf-mobileip-fast-mipv6-01.text, Work in Progress, Apr. 2001.

Moy, J., "OSPF Version 2", RFC 2328, Apr. 1998.

Rekhter, Y. and Li, T., "A Border Gateway Protocol 4 (BGP-4)", RFC 1771, Mar. 1995.

Finlayson, R., Mann, T., Mogul, J., Theimer, M., "A Reverse Address Resolution Protocol", RFC 903, Jun. 1984.

Conta, A., "Extensions to IPv6 Neighbor Discovery for Inverse Discovery Specification", RFC 3122, Jun. 2001.

Postel, J., "Domain Name System Structure and Delegation", RFC 1591, Mar. 1994.

Yeong, W., Howes, T., Kille, S., "Lightweight Directory Access Protocol", RFC 1777, Mar. 1995.

Guttman, E., Perkins, C., Veizades, J., Day, M., "Service Location Protocol, Version 2", RFC 2608, Jun. 1999.

LAN/MAN Standards Committee, "Part 11: Wireless LAN Medium Access Control (MAC) and Physical Layer (PHY) Specifications; High-Speed Physical Layer in the 5GHz Band", IEEE Std 802.11a, 1999.

Conta, A., Deering, S., "Internet Control Message Protocol (ICMPv6) for the Internet Protocol Version 6 (IPv6) Specification", RFC 2463, Dec. 1998.

Khalil, M., Narayan, R., Akhtar, H., Qaddoura, E., "Mobile IP Extensions Rationalization (MIER)", Work in Progress, May 2000.

Eunsoo Shim and Richard D. Gitlin, "Fast Handoff Using Neighbor Information," IETF-Mobile IP Working Group draft-shim-mobileip-neighbor-00.txt, Work-in-Progress, Nov. 2000.

A. Yegin, et al., "Fast Handovers for Mobile IPv6, draft-ietf-mobileip-fast-mipv6-00.txt", Internet Draft, Feb. 2001, pp. 1-24.

* cited by examiner

GEOGRAPHICALLY ADJACENT ACCESS ROUTER DISCOVERY AND CACHING FOR MOBILE NODES

This application claims the benefit pursuant to 35 U.S.C. §119(e) of Provisional U.S. Patent Application Ser. No. 60/345,062, filed on Nov. 2, 2001, which is expressly incorporated herein by reference.

FIELD OF THE INVENTION

The present invention relates generally to network communication of mobile nodes and more particularly, to methods and systems for discovering geographically adjacent access routers and caching such discoveries for use by mobile nodes.

BACKGROUND

Utilization of mobile nodes such as wireless telephones, personal digital assistants (PDAs), handheld computers and other mobile communication devices is gaining popularity. The increased popularity is due in part to improved mobile access to real-time data, audio and video content enjoyed by users of such devices. This mobile networking capability allows relocation without disrupting real-time applications by automatically and non-interactively changing the mobile node's point of attachment as a mobile node relocates.

Mobile Internet protocol (IP) standards for transparently supporting changes in the point of attachment of mobile nodes include *IP Mobility Support (Mobile IPv4)* Network Working Group RFC 2002, C. Perkins (editor), October 1996 and *Mobile Support in IPv6*, IETF Mobile IP, David B. Johnson and Charles Perkins, Jul. 2, 2000. Among other things, these mobile IP standards support adjustments to the routing of messages as mobile nodes geographically relocate.

Typically, mobile nodes operate in a wireless network where points of attachment are provided by radio access points, or radio transceivers, that are geographically dispersed. The radio access points provide communication channels with mobile nodes as well as connectivity with wired networks via an access router. In addition, the radio access points perform handoffs of active communication channels when mobile nodes geographically relocate. In general, handoffs involve passing a communication channel that is currently in use from one radio access point that a mobile node is moving away from, to another geographically adjacent radio access point in closer proximity to the current location of the mobile node.

If geographically adjacent radio access points are associated with different access routers, and therefore different subnets, a handoff between such radio access points may also involve adjustments to the message routing. To perform handoffs that involve message routing adjustments, the mobile nodes need to be aware of the presence of the access routers associated with geographically adjacent radio access points. In the prior art, the current access router may indicate the presence of other access routers to the mobile node from a predetermined list of next candidate access routers. When different subnets are part of two different heterogeneous networks, however, the predetermined list may not include an access router associated with a geographically adjacent radio access point. Similarly, the predetermined list may be incomplete when two subnets within homogeneous networks are topologically distant.

One existing approach to overcome this problem is to manually configure each access router with a geographical neighborhood of other access routers. Such an approach, however, has disadvantages and in many cases may not be feasible. For instance, some of the geographically adjacent access routers may be under different administrative control, and thus, may not be informed of each other's presence. Even within the same administrative domain, the manual configuration approach demands precise network planning to determine the geographical coverage areas of different access routers.

The manual configuration approach may also prove labor intensive and inefficient where the access routers can be physically relocated or experience changes in coverage area. In these cases, the geographical scope of the coverage areas may need review and revision each time such changes occur. Relocation and coverage area changes are common in areas of increasingly heavy traffic where access routers may be temporarily and/or permanently introduced.

Another approach is based on special location information such as GPS (Global Positioning Satellite) systems. A GPS based system can provide physically adjacent candidate access routers and/or access points to current access points and/or mobile nodes. GPS, however, is not always available especially within buildings and other structures where satellite communication is difficult.

SUMMARY

The present invention discloses a geographically adjacent access router discovery (GAARD) system for discovering geographically adjacent access routers (GAARS). The GAARD system may utilize mobile nodes to discover geographically adjacent access routers. The geographically adjacent access routers may be in different heterogeneous systems, or may be topologically distant access routers in the same system. Once discovered, the identity of geographically adjacent access routers may be cached for future use.

The GAARD system may operate within mobile nodes and access routers of communication systems. A mobile node with a current point of attachment provided by an access router via an access point may receive beacon signals. The beacon signals may be transmitted by geographically adjacent access points associated with geographically adjacent access routers. The beacon signals may include a link layer ID of the respective access point. The GAARD system may use the link layer ID to resolve the network layer address of the associated geographically adjacent access router.

When a mobile node receives a beacon signal, the link layer ID may be extracted. A cache within the GAARD system may be accessed to determine the associated network layer address. The cache may include mapped associations of link layer IDs to network layer addresses. If a cache within the mobile node includes a mapped association(s) of the link layer ID to a network layer address, the mobile node may resolve the network layer address of the geographically adjacent access router from the cache and prepare for a handoff. If the mapped associations do not appear within the mobile node, the mobile node may generate a solicitation message that includes the link layer ID received in the beacon signal.

The solicitation message may be transmitted to the access router providing the current point of attachment for the mobile node. Upon receiving the solicitation message, the GAARD system within the access router may access a cache to resolve the network layer address. If the cache within the access router does not include mapping of the link layer ID to a network layer address, the access router may dynamically determine the associated network layer address.

Upon resolving the network layer address of the geographically adjacent access router, the access router providing the current point of attachment may transmit the network layer address to the mobile node in an advertisement message. If not already cached, the network layer address may be mapped to the link layer ID and the association may be cached. Utilizing the network layer address, applications operating in the mobile node and the access router providing the current point of attachment may be optimized. For example, the network layer address may be used to begin preparation for handoff of the mobile node to the geographically adjacent access router. Accordingly, seamless network layer handoffs may be performed, such as fast handover and context transfer, with optimum efficiency.

Another interesting feature of the GAARD system involves the cache in the mobile node. When a mobile node establishes a point of attachment with an access router via an access point, the cache in the access router may be transmitted to the mobile node and cached. Thus, the mapped associations of link layer IDs and network layer addresses previously discovered and cached in the access router may by provided to any mobile node that establishes a current point of attachment with the access router.

Yet another interesting feature of the GAARD system involves dynamic determination of network layer addresses for which a mapped association to a link layer ID is not previously cached. Upon receipt of a link layer ID with no cached mapped association to a network layer address, the access router may utilize a multicast approach and/or directory approach to dynamically resolve the network layer address. With the multicast approach, a network layer address may be provided in response to a multicast service request that includes the link layer ID. In the directory approach, a network layer address may be provided in response to a query to a directory server.

Still another interesting feature of the GAARD system involves the mobile nodes. Through continuous roaming, the mobile nodes act as sensors for the access routers within the GAARD system to continually identify geographically adjacent access routers based on link layer IDs received via beacon signals. Accordingly, the cached mapped associations of link layer IDs and associated network layer addresses may be repetitively confirmed. In addition, any changes or previously unmapped associations may be identified, resolved and cached simply by the roaming of the mobile nodes.

Further objects and advantages of the present invention will be apparent from the following description, reference being made to the accompanying drawings wherein preferred embodiments of the present invention are clearly shown.

DETAILED DESCRIPTION OF THE PREFERRED EMBODIMENTS

The invention provides a system and method for discovering geographically adjacent access routers using mobile nodes.

Figure 1:
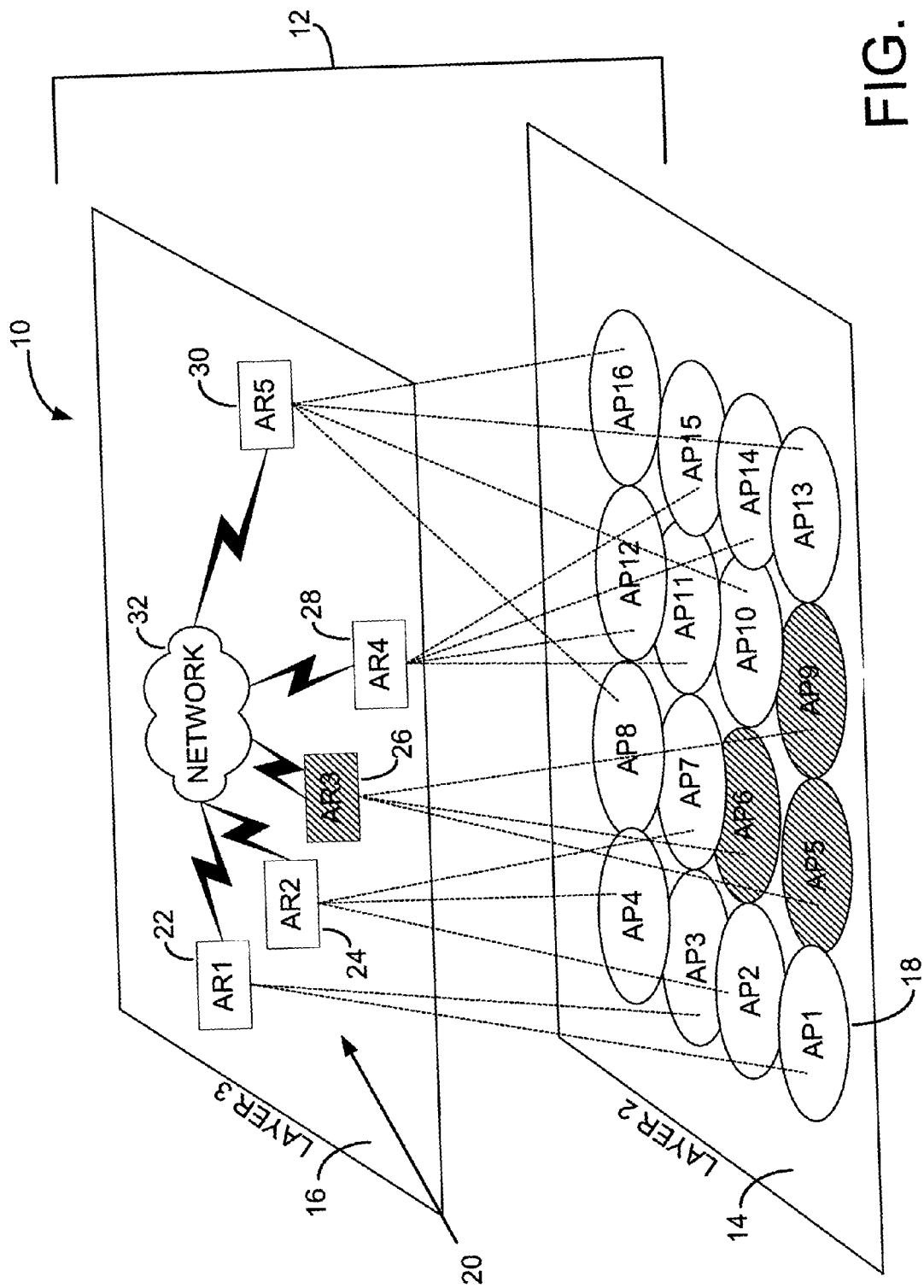
FIG. 1 is a block diagram of an exemplary networking framework in which a Geographically Adjacent Access Router Discovery (GAARD) System may operate.

FIG. 1 depicts one embodiment of a geographically adjacent access router discovery (GAARD) system 10 operating within an exemplary networking framework 12. The networking framework 12 includes representation of a portion of the Open System Interconnection (OSI) model. The OSI model is a seven layer abstract model of networking in which protocols in each of seven layers interact with the protocols in the layer directly below and provide facilities for the use of the layer directly above. The model includes a physical layer, a data link layer, a network layer, a transport layer, a session layer, a presentation layer and an application layer.

In the illustrated embodiment, the networking framework 12 includes a second layer 14 and a third layer 16 which are representative of the data link layer and the network layer, respectively, within the OSI model. In general, protocols operating in the data link layer, such as, for example, IEEE 802.3 (Ethernet), IEEE 802.4, IEEE 802.5, IEEE 802.11, etc., logically organize and control data transmission performed with the physical layer. Protocols such as, for example, Internet protocol (IP), address resolution protocol (ARP), reverse address resolution protocol (RARP), Internet control message profile (ICMP), bootstrap protocol (BOOTP), etc., operating in the network layer perform routing, addressing and generally manage data traffic.

The second layer 14 of the illustrated networking framework 12 includes a plurality of access points 18 identified as AP1 through AP16. The access points 18 are preferably radio access points (also known as base stations) operating as radio transceivers within wireless networks. The access points 18 are capable of providing radio communication channels with mobile nodes (not shown). In the presently preferred embodiments, each of the access points 18 are identified with a unique link layer ID. The link layer ID may be an address or any other form of unique identifier associated with the data link layer (the second layer 14).

The third layer 16 includes a plurality of corresponding access routers 20 identified as first access router (AR1) 22, second access router (AR2) 24, third access router (AR3) 26, fourth access router (AR4) 28 and fifth access router (AR5) 30. The access routers 20 may be any device or mechanism capable of forwarding data between, and/or within, networks. Overall administration as well as identification of subnets may be performed with the access routers 20. In Mobile IP for example, the access routers 20 may be the home agents and foreign agents that provide connectivity for mobile devices roaming among the subnets created with the access routers 20.

Each of the access routers 20 may be uniquely identified by a network layer address. The network layer address provides an address to which information may be routed over a network 32. The network 32 may include wireless and/or wireline communication. In addition, the network 32 may include communication over the Internet, a local area network (LAN), a wide area network (WAN), an intranet, an extranet, a public switched telephone network (PSTN) and/or any other form of network(s) providing a communication path. In the illustrated embodiment, the third layer 16 utilizes the Internet protocol (IP) for communication among the access routers 20 over the network 32. Accordingly, the network layer address of the each of the access routers 20 is an IP address, and the network 32 is an IP network. In other embodiments, other protocols, such as, for example, ARP, RARP, ICMP, BOOTP may be utilized.

In addition, each of the access routers 20 communicates with at least one associated access point 18. The access points 18 in the second layer 14 underneath the access routers 20 are individually associated with at least one of the access routers 20. Accordingly, mobile nodes with an attachment point provided by one of the access points 18 and associated access router 20 may communicate over the network 32. Association of the access points 18 with access routers 20 may be based on contractual relationships, equipment ownership, geographical location or any other criteria. In the exemplary embodiment, association of the access points 18 with the access routers 20 is illustrated by dotted lines. Preferably, each of the access routers 20 has knowledge of the link layer IDs for each of the underlying access points 18 associated therewith.

As used herein, the term "geographically adjacent access router(s)" (GAAR(s)) refers to access routers 20 with underneath access points 18 having coverage areas that are "geographically" adjacent to, or overlapping, the coverage areas of access point(s) 18 of another access router 20. For example, access router AR3 26 with associated access points 18 (AP5, AP6, AP9) is geographically adjacent to access routers AR1 22, AR2 24 and AR5 30 due to geographically adjacent access points 18 (AP1, AP2, AP3, AP7, AP10, AP13).

The geographical vicinity of the coverage areas of two access routers 20 is not necessarily implied by "logical" adjacency. In general, logical adjacency refers to a low number (preferably one) of intermediate connections, or hops, between two access routers 20. Geographical adjacency of the coverage areas of two access routers 20, on the other hand, implies that a mobile node can physically move from the coverage area of one access router 20 to another without involvement of any intervening access routers 20.

Geographically adjacent access routers (GAARs) need not be logically adjacent, and, may have addresses in different administrative domains, be in different subnets (e.g. topologically distant) or may be part of different autonomous systems. Due to the lack of logical adjacency, access routers 20 that are geographically adjacent may be unaware of each other. Logical adjacency may be created among devices, portion(s) of system(s) and/or system(s) by manually identifying the existence of other devices, portions of system(s) and/or system(s) with device lists, etc. Alternatively, logical adjacency may be dynamically created with the GAARD system 10.

Figure 2:
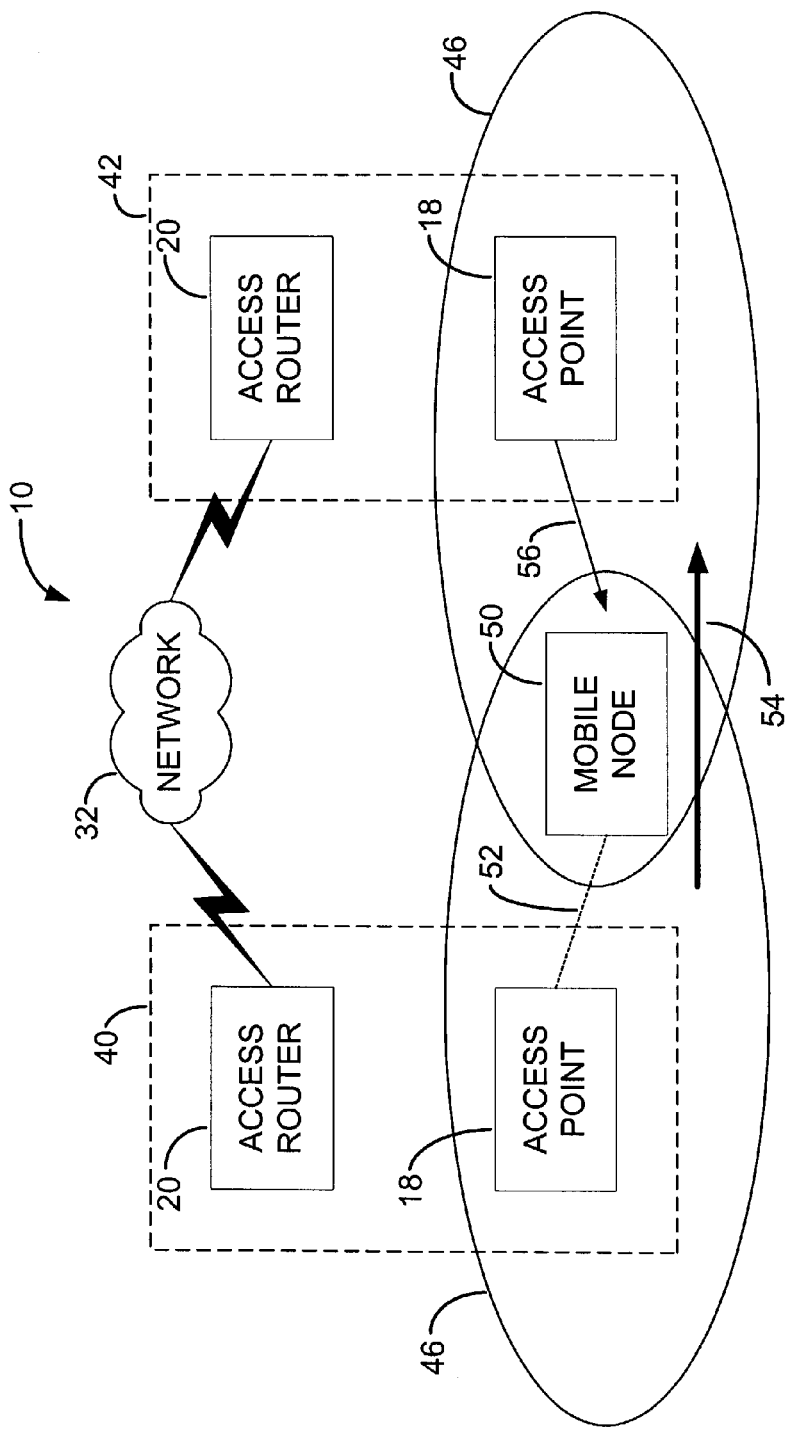
FIG. 2 is a block diagram of a first system and a second system utilizing one embodiment of the GAARD system.

FIG. 2 is a block diagram illustrating a portion of a first system 40 enabled to communicate with a portion of a second system 42. The first and second systems 40, 42 may be representative of any association of communication equipment that is affiliated to form respective independent communication networks, such as, for example, wireless networks. In these exemplary embodiments, the first and second systems 40, 42 are not logically adjacent. For example, the first and second systems 40, 42 may be autonomous systems communicating with a border gateway protocol (BGP) or other inter-domain routing protocol. In another example, the first and second systems 40, 42 may be topologically distant subnets within the same autonomous system. The first and second systems 40, 42 preferably include the functionality of the GAARD system 10 and therefore are capable of discovering each other as hereinafter described to create logical adjacency where geographic adjacency exists.

Similar to the previously discussed embodiments, the first and second systems 40, 42 each include geographically adjacent access routers 20 coupled with associated geographically adjacent access point(s) 18. Communication between the first and second systems 40, 42 of this embodiment may be over the network 32. Although not illustrated, communication within the first and second systems 40, 42 as well as over the network 32 may include border routers, interior routers and/or any other routing mechanisms allowing transmission of information.

In the illustrated embodiment, each of the access points 18 is preferably a base station within a wireless system that includes a cell coverage area 46. A mobile node 50 within the cell coverage area 46 may be provided a current point of attachment by the access point 18 and access router 20 of the first system 40 as illustrated by dotted line 52. In addition, the mobile node 50 may roam into the cell coverage area 46 of the access point 18 in the second system 42 as illustrated by arrow 54.

Since the first and second systems 40, 42 are separate autonomous systems, the access router 20 in the first system 40 may not be aware of the access router 20 in the second system 42. Accordingly, the access router 20 in the second system 42 may not be considered as a candidate for handoff of the mobile node 50 even though the mobile node 50 has entered the cell coverage area 46 of the associated access point 18.

Within the GAARD system 10, the criterion for the access router 20 in the second system 42 to be a candidate for a handoff is the geographical adjacency of the access points 18 in the first and second autonomous systems 40, 42, and not the topological adjacency of the corresponding access routers 20. Hence, routing protocols operating in the third layer 16 (FIG. 1), such as open shortest path first protocol (OSPF), BGP or any other network layer protocols, are not capable of independently discovering geographically adjacent access routers 20.

Interaction of protocols operating in the data link layer 14 (FIG. 1), however, are aware of geographically adjacent access points 18. Accordingly, the GAARD system 10 may provide interaction between the protocols of the second layer 14 (FIG. 1) and of the third layer 16 (FIG. 1) to identify geographically adjacent access routers 20 and create logical adjacency. Logical adjacency may be utilized to quickly adjust the routing when the point of attachment changes. The ability to quickly change the routing when the point of attachment changes is important to optimizing operation of real-time mobile applications.

Interaction between the protocols involves properly translating handoff trigger information available in the link layer (the second layer 14) to information useable in the network layer (the third layer 16) during the handoff process. Timely translation from trigger information to corresponding network layer information may expedite the handoff process since network level handoff processing is time-consuming when compared to the almost-instantaneous and automatic link layer handoff processing.

During operation, the mobile node 50 may receive a transmitted beacon signal that is broadcast by the access points 18. In general, the beacon signal is a well-known signal that is broadcast by access points 18 to provide information identifying each access point 18 as a potential handoff candidate for the mobile node 50. The mobile node 50 may receive beacon signals that are in range, e.g. when the mobile node 50 enters the cell coverage area 46 of geographically adjacent access points 18. In the exemplary embodiment illustrated in FIG. 2, the mobile node 50 may receive the broadcast beacon signal of the access point 18 in the second system 42 as illustrated by arrow 56. Accordingly, the access router 20 in the first system 40 is geographically adjacent to the access router 20 in the second system 42.

Among other things, the beacon signal may include the link layer ID of the access point 18 in the second system 42. Preferably, the mobile node 50 may detect, receive and decode two or more beacon signals while simultaneously communicating with at least one access point 18 and associated access router 20 operating as a current point of attachment. With the link layer IDs of geographically surrounding access points 18, the mobile node 50 may utilize the GAARD system 10 to dynamically identify geographically adjacent access routers (GAARs) across different subnets. Identification of geographically adjacent access routers (GAARs) involves identifying the network layer address of the access router 20 associated with the access points 18 based on the link layer ID. Since identification of the network layer address of the geographically adjacent access routers (GAARs) may occur dynamically prior to an actual handoff, the access router 20 providing the current point of attachment and the mobile node 50 may prepare for such a handoff. Preparation for the handoff with the GAARD system 10 may provide fast, efficient and seamless handoffs among geographically adjacent access routers (GAARs).

The mobile node 50 may effectively function as a sensor within the GAARD system 10 to identify geographically adjacent access routers (GAARs) in heterogeneous networks and systems. As the mobile node 50 roams, the identity of surrounding geographically adjacent access routers (GAARs) may be discovered via received link layer IDs. Utilizing the link layer IDs, the GAARD system 10 may, for example, anticipate the handoff of the mobile node 50 by discovering the network layer addresses of all geographically adjacent access routers (GAARs). Accordingly, preparation for the handoff may be performed to expedite processing during the handoff procedure.

The GAARD system 10 may also provide a dynamic caching function. The caching function may allow network layer addresses of discovered geographically adjacent access routers (GAARs) to be mapped to link layer IDs of associated access points 18. The mapped associations may be cached within the GAARD system 10 to create logical adjacency of geographically adjacent access routers (GAARS). Upon receipt of a link layer ID from an access point 18, the mobile node 50 may access cached mapped associations to determine an associated network layer address of a geographically adjacent access router (GAAR). The mapped associations may be cached in the access point 18, the access router 20, the mobile node 50 and/or anywhere else in the network 32. Upon identification of the geographically adjacent access router (GAAR) preparation for a handoff may be performed. Where a mapped association of a received link layer ID and a network layer address is not cached, the GAARD system 10 may dynamically identify the associated geographically adjacent access router (GAAR) based on the link layer ID and then cache a mapping of the association for future use.

Figure 3:
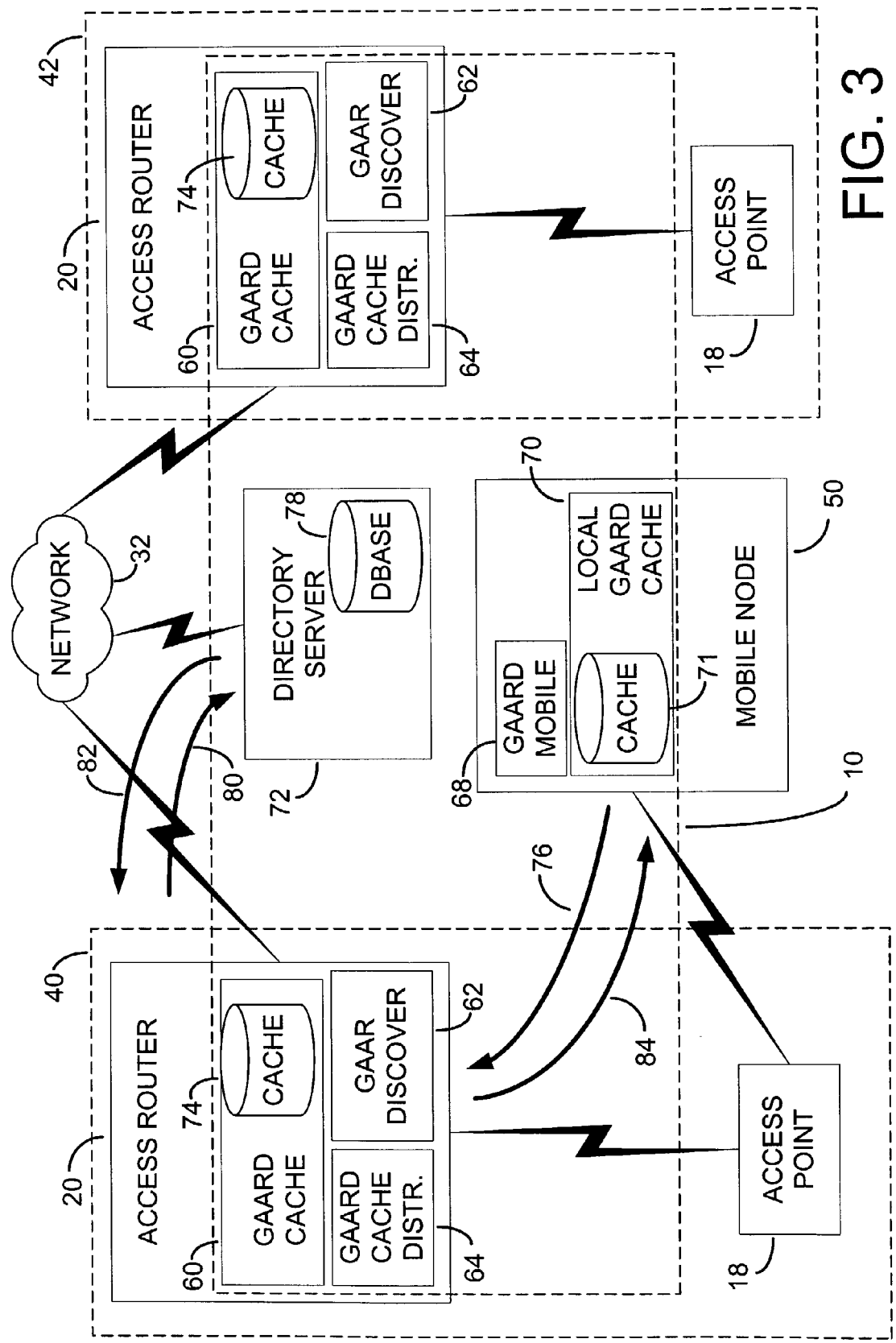
FIG. 3 is a more detailed block diagram of one embodiment of the first and second systems depicted in FIG. 2.

FIG. 3 is a more detailed block diagram of the first and second systems 40, 42 illustrated in FIG. 2 illustrating the functionality of one embodiment of the GAARD system 10. As in the previous embodiment, the first and second systems 40, 42 include geographically adjacent access points 18 and access routers 20. In addition, the current point of attachment of the mobile node 50 may be the access point 18 and access router 20 in the first system 40.

The GAARD system 10 may include a GAARD cache component 60, a GAAR discovery component 62 and a GAARD cache distribution component 64 within each of the access routers 20. In addition, the GAARD system 10 may include a GAARD mobile component 68 and a local GAARD cache component 70 within the mobile node 50. The GAARD system 10 may also include at least one directory server 72 in communication with the network 32. In other embodiments, the components of the GAARD system 10 may operate in other devices. In addition, fewer or greater numbers of components may also represent the functionality of the GAARD system 10.

The GAARD cache component 60 may include lookup and maintenance functionality for a dynamic listing of mapped associations of link layer IDs associated with network layer addresses for equipment operating in autonomous systems. The mapped associations of link layer IDs and network layer addresses represent geographically adjacent access points 18 and associated geographically adjacent access routers (GAARs). Accordingly, the mapped associations in each of the access routers 20 will vary depending on the access points 18 that are geographically adjacent. The GAARD cache component 60 may include capability to store, manipulate and access these mapped associations within a cache 74. The cache 74 may include a relational database within each of the access routers 20. In other embodiments, the cache 74, or a portion of the information in the cache 74, may be cached elsewhere on the network 32 and may be independently accessed by each of the access routers 20.

The GAARD cache component 60 may also have cache timeout functionality. Cache timeout functionality may monitor parameters associated with the cache 74 such as, for example, the length of time mapped associations have been cached without being accessed, the size of the cache 74 and/or any other variable associated with the cache 74. When a predetermined threshold(s) has been reached for one of the cached mapped associations, the GAARD cache component 60 may remove the mapped associations from the cache 74.

Figure 4:
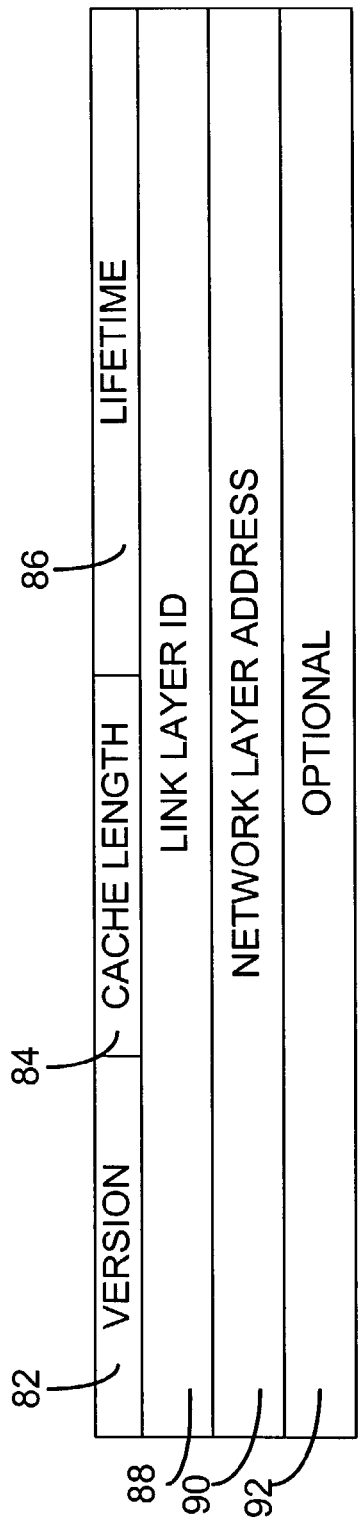
FIG. 4 is a table depicting one embodiment of a cached data entry of the GAARD system.

FIG. 4 is a table illustrating one embodiment of the format of each record representing a mapped association within the cache 74. Each record includes a version field 82, a cache length field 84, a lifetime field 86, a link layer ID field 88, a network layer address field 90 and at least one optional field 92. The version field 82 may identify the version of the protocol operating in the GAARD system 10. The cache length field 84 may indicate the size of the record, and the lifetime field 86 may indicate when the record was cached. The mapped association may be provided by the data in the link layer ID field 88 and the network layer address field 90. The optional fields 92 may be one or more variably sized fields to accommodate one or more messages. The messages may include additional information associated with the link layer ID, such as an access router network layer address, an access router link layer address, an access router network prefix and/or care of addresses.

Figure 5:
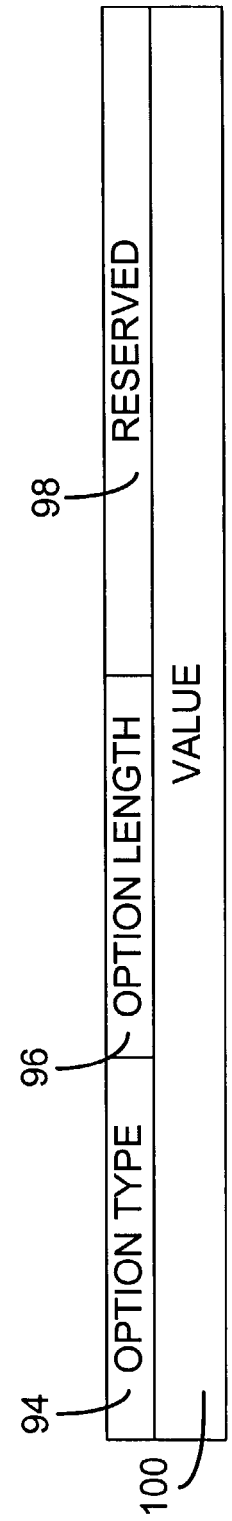
FIG. 5 is a table depicting a more detailed embodiment of a portion of the cached data entry of FIG. 4.

FIG. 5 is a table illustrating one embodiment of the optional fields 92 included in the record illustrated in FIG. 4. The optional fields 92 may include an option type field 94 identifying a message type and an option length field 96 identifying a message length. In addition, the optional fields 92 may include a reserved field 98 for future use and a value field 100 that includes the main body of the message(s).

Referring again to FIG. 3, the GAAR discovery component 62 may include functionality to identify a network layer address of a geographically adjacent access router (GAAR) operating in autonomous systems based on a link layer ID. Activation of the GAAR discovery component 62 may occur when a link layer ID is received by the mobile node 50 from an access point 18 in an autonomous system for which no mapped associations are present in the cache 74.

Such link layer IDs may be provided to the GAAR discovery component 62 in a solicitation message. In the illustrated embodiment, solicitation messages may be sent from the mobile node 50 through the first system 40 to the associated access router 20 via the access point 18 as illustrated by arrow 76. The solicitation messages may be included as an extension of the communication protocol(s) in use in the first and second systems 40, 42. In the presently preferred embodiments, the communication protocol may be any of a number of versions of an IP protocol, such as, for example, IPv6 and IPv4. In other embodiments, any other communication protocol(s) may be utilized.

Figure 6:
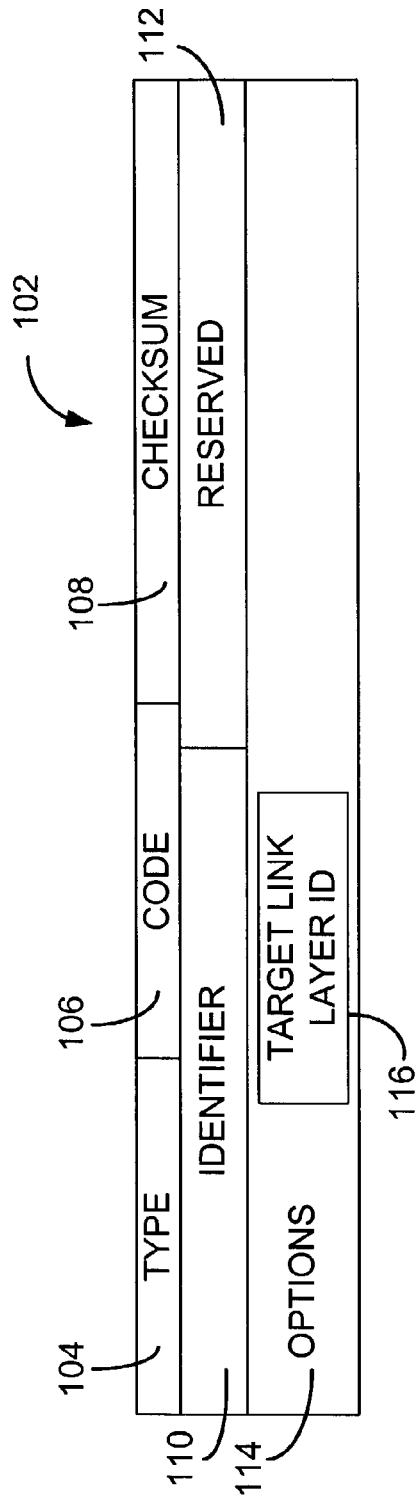
FIG. 6 is a table depicting the format of one embodiment of a solicitation message within the GAARD system.

FIG. 6 is a table illustrating a portion of the format of an IP protocol that includes a solicitation message. Although not illustrated, part of the IP protocol may include a source address of the mobile host 50, a destination address of the access router 20 designated to receive the message, a hop limit, such as 255, and an authentication header which may include security. The IP protocol may also include an Internet control message protocol (ICMP) 102. The ICMP 102 is a feature of IP protocols and includes a type field 104, a code field 106, a checksum field 108, an identifier field 110, a reserved field 112 and an options field 114.

In the presently preferred embodiments, a solicitation message may be included as an extension within the IP protocol. The configuration of data within the fields of the ICMP 102 may identify and provide the solicitation message. The type field 104 may be any predetermined type code that uniquely identifies the message as a solicitation message. The code field 106 may similarly be any predetermined value. Preferably, the value of the code field in a solicitation message is zero. The checksum field 108 is a well-known checksum of the ICMP 102 and is dependent on the IP protocol in use. The identifier field 110 may be set by the sender (e.g. the mobile node 50) so replies may be matched to the solicitation message. The reserve field 112 may be set to zero by the sender and ignored by the receiver (e.g. the access router 20).

The options field 114 in a solicitation message may include a target link layer ID field 116. In other embodiments, additional fields may be included in the options field 114. Additional fields in the options field 114 not recognized by the access router 20 are preferably ignored during processing of the solicitation message. The target link layer ID field 116 may include the link layer ID of the access point 18 received via a beacon signal by the mobile node 50. In the embodiments illustrated in FIGS. 2 and 3, the link layer ID received by the mobile node 50 is from the access point 18 in the second system 42.

Figure 7:
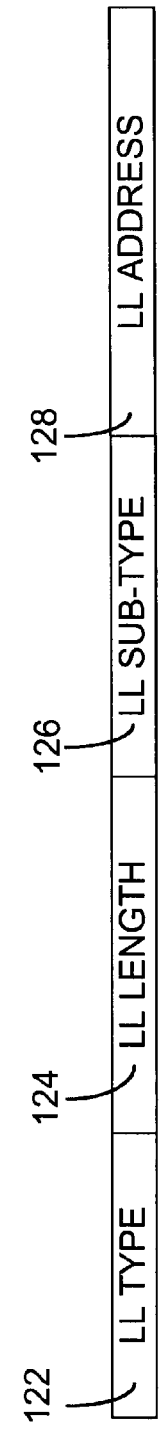
FIG. 7 is a table depicting a more detailed embodiment of a portion of the solicitation message of FIG. 6.

FIG. 7 is one embodiment of a target link layer ID field 116. The target link layer ID field 116 includes an LL type field 122, an LL length field 124, an LL subtype field 126 and an LL address field 128. In other embodiments, the target link layer ID field 116 may include additional fields associated with communication in the GAARD system 10.

The LL type field 122 may include any predetermined unique identifier to identify the target link layer ID field 116. The LL length field 124 may indicate the total length of the target link layer ID field 116 preferably in units of eight octets. The LL sub-type field 126 may include any one of a plurality of codes communicated by the mobile node 50 to the access router 20.

In the presently preferred embodiments, the codes may be any of five unique codes. A first code, such as "0", may identify a solicitation request as a request to provide all of the cached mapped associations of link layer IDs and network layer addresses stored in the access router 20. A mobile node 50 may make such a request upon obtaining a point of attachment with an access router 20. A solicitation message that includes a second code, such as "1", may be identified as a request for the link layer ID of a new point of attachment for the mobile node 50. The link layer ID of the new point of attachment may be a next access point 18 and associated access router 20 identified by the access router 20 as a good candidate for handover of the mobile node 50. A third, fourth and fifth code may be utilized in advertisement messages that are discussed later, and may therefore be ignored within solicitation messages.

The LL address field 128 in the solicitation message may contain the link layer ID received by the mobile node 50 from the beacon signal. In one embodiment, the content and format of the LL address field (including byte and bit ordering) may be specified by a predetermined standard, such as a specific document(s) describing IPv6 operation over different link layers. In another embodiment, an additional field may be included in the target link layer ID field 116 identifying the content and format. In still another embodiment, the LL address field 128 may include header information identifying the content and format.

During operation, after the access router 20 receives a solicitation message, the access router 20 may first check the LL sub-type field 126 of the target link layer ID field 116. If the LL sub-type field 126 is set to NULL (e.g. "0"), the access router 20 may send the whole cache stored in the cache 74 of the GAARD cache component 60 back to the mobile node 50 in an advertisement message. If the LL address field 128 is set to NULL and the LL sub-type field 126 is not NULL, the access router 20 may send all the cache entries which have the same link layer type as indicated in LL sub-type field 126 back to mobile node 50. If the LL address field 128 includes a link layer ID, and a mapped association to a network layer address is found in the cache 74, the access router 20 may format an advertisement message and send the associated network layer address back to the mobile node 50. If on the other hand, mapped associations of the network layer address to the link layer ID cannot be found in the cache 74, the GAAR discovery component 62 may be activated to dynamically discover the network layer address associated with the link layer ID.

Referring again to FIG. 3, the GAAR discovery component 62 may dynamically identify a network layer address not previously mapped to a link layer ID in the cache 74 by utilizing a multicast approach. In a multicast approach, the access routers 20 are preferably joined in a multicast group. Accordingly, each of the access routers 20 in the multicast group may receive, process and, where appropriate, respond to multicast service request messages generated by other access routers 20 within the multicast group. Following receipt of a link layer ID for which no network layer address is mapped, an access router 20 may multicast a service request message to the other access routers 20 in the multicast group. The multicast service request message and response thereto may be transmitted over the network 32.

The GAAR discovery component 62 may also utilize a directory approach. In the directory approach, the directory server 72 may be used to identify geographically adjacent access routers (GAARs) based on link layer IDs. The directory server 72 may be any device with capability for communication over the network 32 that is responsive to requests and includes data caching functionality. Preferably, the directory server 72 is a server computer communicating over the network 32 in support of the GAARD system 10. The directory server 72 may operate with any network compatible communication protocol, such as domain naming system (DNS), lightweight directory access protocol (LDAP) or a service location protocol (SLP).

The directory server 72 may include a database 78 as illustrated in FIG. 3. The database 78 may be a relational database capable of caching information for each of the access routers 20. The information cached in the database 78 may be identified based on the access routers 20. Preferably, the information is separately identified for each of the access routers 20 and includes mapped associations of link layer IDs of access points 18 to associated network layer addresses of geographically adjacent access routers (GAARs).

Requests to the directory server 72 may be in the form of a service request message query generated by one of the access routers 20 and transmitted over the network 32 to the directory server 72. Preferably, the directory server 72 is capable of handling requests from different access routers 20 in different subnets and/or administrative domains. In addition, the different access routers 20 preferably register mappings to associated access points 18 by storing in the database 78 cross-reference mapped associations between network layer addresses of the access routers 20 and the link layer IDs of associated access points 18. As changes in the mapped associations occur, the access routers 20 preferably register such changes with the directory server 72 using service request messages. Accordingly, the database 78 within the directory server 72 may be dynamically updated to maintain the current mapped associations between the network layer addresses and the link layer IDs.

Upon receipt of a service request query containing a link layer ID, the directory server 72 performs a lookup function within the database 78 to identify a corresponding network layer address. The directory server 72 may generate a reply message containing the link layer ID and the associated network layer address. The reply message may be transmitted to the access router 20 making the service request query.

In one embodiment, SLP may be used for communication with the directory server 72. In general, SLP is a standard protocol set forth in an SLP specification. In this embodiment, SLP may be used to resolve the network layer address of a geographically adjacent access router (GAAR) across multiple subnets. In other embodiments, other protocols, such as, for example, inter-administrative domain discovery may be utilized.

As previously discussed, at each access router 20, a list of the link layer IDs of the access points 18 connected thereto may be maintained. In one embodiment, where the directory server 72 is deployed with SLP, the access router 20 may format and send a service registration message (ServReg). The ServReg message may include both the network layer address of the access router 20 and a list of link layer IDs for the connected access points 18. The list may be transmitted periodically to the directory server 72 to update the database 78.

Where the queries are not directed to the directory server 72, SLP may still be utilized. In this scenario at least one of the access routers 20 may function as an SLP Service Agent (SA). Functioning as the SLP SA, the access router 20 may service queries from other access routers 20 for network layer addresses associated with link layer IDs.

In embodiments using SLP, an access router 20 providing a current point of attachment may receive a solicitation message from the mobile host 50 requesting a network layer address associated with a link layer ID. Where a mapped association of the network layer address to the link layer ID is not found in the cache 74, the access router 20 may format a Service Request (ServReq) message which queries for network layer address(es) associated with the link layer ID. For example, when the access router 20 resolves the network layer address associated with the link layer ID=XXXX, the access router 20 may function as an SLP User Agent (UA) and format and send a ServReq message. An exemplary ServReq message is:

<service:gaard;(link-layer-id=XXXX)>.

After receiving the ServReq message, either the directory server 72 or an access router 20 acting as an SLP SA in conformance with the SLP specification may reply with a Service Reply message. For example, the access router 20 who is connected to the access point 18 with link layer ID XXXX may respond with the Service Reply message. An exemplary embodiment of a Service Reply message is:

<service:gaard://(host);link-layer-id=XXXX;
    addr=YYYY> where addr is the network layer address.

Another exemplary embodiment of a Service Reply message that the access router 20 may send back is:

<service:gaard://(host);link-layer-id=XXXX;
    addr=YYYY;network_prefix=ZZZZ>

In this exemplary Service Reply message, the access router 20 may send back the network layer address, such as an IP address, of the access router 20 that is associated with the access point 18 identified by the link layer ID. In addition, the access router 20 may send back a network prefix (ZZZZ) of the network, such as, for example, the prefix of the first network 40 in which the access router 20 operates. The GAARD system 10 may provide any other form or data as part of a flexible solution capable of providing whatever format/information is useful to assist the mobile node 50. Following receipt, mapping of the network layer address to the link-layer ID and caching of the mapped association by the GAARD cache component 60, the GAARD cache distribution component 64 may be activated.

Referring once again to FIG. 3, the GAARD cache distribution component 64 may download cached information to the mobile node 50. Communication of cached mapped information may be based on the solicitation message received from the mobile node 50. Alternatively, the download may be based on any other identified parameters, such as when a point of attachment for the mobile node 50 is first established, a predetermined time period or any other variable associated with operation of the mobile node 50.

Based on a solicitation message, or any other parameter, the GAARD cache distribution component 64 may generate an advertisement message. The advertisement message may be transmitted to the mobile node 50 via the access point 18 providing the current point of attachment as illustrated by arrow 84.

Where the advertisement message is the result of a solicitation message, depending on the code included in the LL sub-type field 126 (FIG. 7), the advertisement message may include one or more network layer addresses of access routers 20 associated with link layer IDs of access points 18. Where the advertisement message is generated based on other parameters, the mapped associations included in the advertisement message may be included based on these parameters. Similar to the solicitation message, the advertisement message may be included in any communication protocol(s) in use in the first and second systems 40, 42. In the presently preferred embodiments, the communication protocol is an IP protocol.

Figure 8:
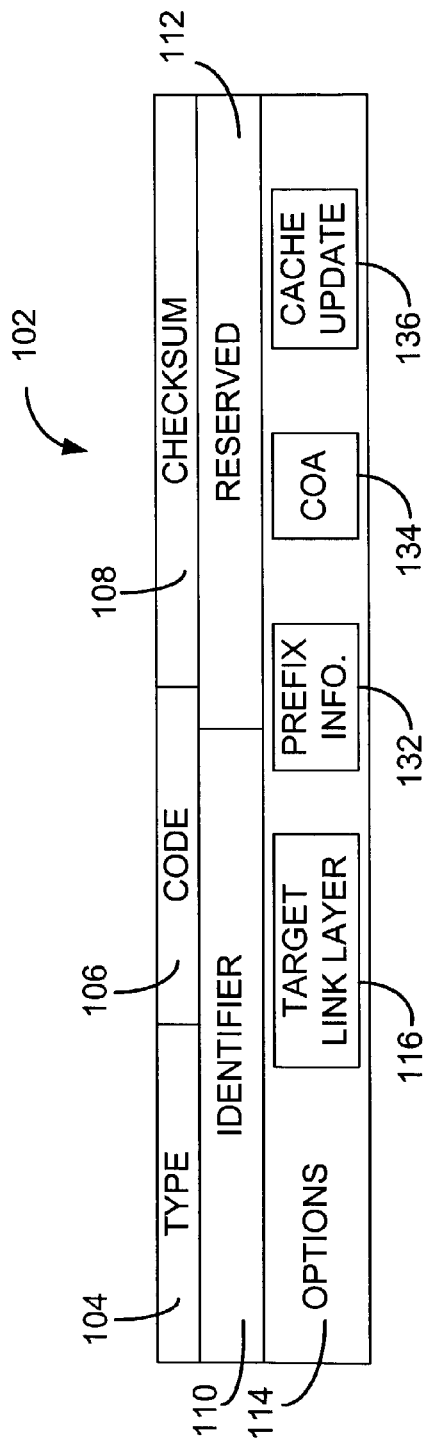
FIG. 8 is a table depicting the format of one embodiment of an advertisement message within the GAARD system.

FIG. 8 is a table illustrating an exemplary embodiment of the IP protocol that includes the advertisement message. Similar to the solicitation message of FIGS. 6 and 7, the advertisement messages may be included as an extension within ICMP 102 of the IP protocol. The configuration of the data within the fields of the ICMP 102 may identify and provide the advertisement message. For purposes of brevity, the remaining description of the advertisement messages will focus on the differences with the previously discussed solicitation messages.

The code field 106 of an advertisement message may be any of a plurality of predetermined values. In one embodiment, the value of the code field 106 comprises any one of three values. A first value may indicate that the advertisement message includes information from the access router 20 related to handover of the mobile node 50. A second value may be indication from the access router 20 that no change in the current point of attachment is needed. Indication that the link layer ID identified by the mobile node 50 in the solicitation message is unknown to the access router 20 may be identified by a third value. In other embodiments, additional values may be included in the code field 106 related to handover of the mobile node 50.

The value of the identifier field 110 is preferably copied from the solicitation message, or set to zero where the advertisement message is not the result of a request from the mobile node 50.

The options field 114 of the advertisement message may include the target link layer ID field 116 and a prefix information field 132. In addition, a new change of point of attachment (COA) field 134 and/or a cache update field 136 may also be included in the options field 114. In other embodiments, additional fields may be included in the options field 114, such as, care off address information which may be used in the next subnet and cache update information which may indicate changes in the network layer ID and link layer ID mapping. Additional fields in the options field 114 not recognized by the receiver of the advertisement message (the mobile node 50) may be ignored during processing of the advertisement message by the receiver.

The format of the target link layer ID field 116 may be similar to that previously described with reference to FIG. 7. Accordingly, the LL address field 128 (FIG. 7) may include the link layer ID of the access point 18 for which a network layer address is requested. The LL sub-type field 126 (FIG. 7) may, similar to the solicitation message, include any of five unique codes. The first and second codes may be part of solicitation messages and therefore may be ignored in an advertisement message.

A third code, such as a code of "2," may indicate that the advertisement message from the access router 20 includes the link layer ID of the mobile node 50 provided when the mobile node 50 first forms a new point of attachment with the access router 20. A fourth code, such as a code of "3," may indicate that the network layer address of the access router 20 associated with the link layer ID received with a beacon signal is being provided in the advertisement message. When a fifth code, such as a code of "4," is provided, the communication protocol for wireless communication, such as, for example IEEE 802.11 may be identified by the advertisement message.

The prefix information field 132 may specify an address, such as, for example, the IP address and a prefix associated with the link layer ID included in the LL address field 128 (FIG. 7). As used herein, the term "prefix" refers to a portion of the addressing common to a plurality of devices, such as a plurality of devices in the same subnet.

Figure 9:
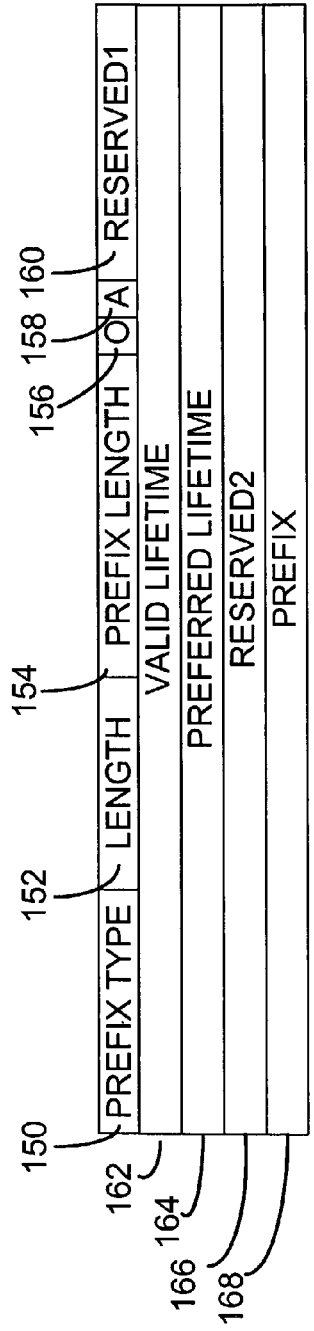
FIG. 9 is a table depicting a more detailed embodiment of a portion of the advertisement message of FIG. 8.

Referring now to FIG. 9, the illustrated embodiment of the prefix information field 132 includes a prefix type field 150, a length field 152, a prefix length field 154, an on-link flag 156, an address flag 158, a reserved1 field 160, a valid lifetime field 162, a preferred lifetime field 164, a reserved2 field 166 and a prefix field 168. In other embodiments, additional fields, such as, the link layer ID of the access router 20 providing the current point of attachment.

The prefix type field 150 may be any predetermined unique identifier of the prefix information field 132. The length field 152 may indicate the length of the prefix information field 132. In the presently preferred embodiments, the length is equal to four bits. The prefix length field 154 identifies the number of leading bits in the prefix field 168 that are valid. In one embodiment, the prefix length field 154 is in an "8-bit" unsigned integer format with values ranging from "0" to "128."

The link flag 156 is preferably a 1-bit flag. When set (equal logic one), the link flag 156 may indicate that the prefix in the prefix field 168 may be utilized for on-link determination using the advertisement message. The term "on-link" refers to a network layer address that is assignable to a mobile node 50 (an interface) being provided a current point of attachment (a link) by the access router 20. On-link determination refers to a technique for configuring a network layer address of a mobile node 50 using advertisement messages. When the link flag 156 of this embodiment is not set (equal logic zero) the advertisement message may include no indication of on-link or off-link properties of the prefix included in the advertisement message. For example, the prefix may be used for address configuration with some of the addresses belonging to the prefix being on-link and others being off-link. The term "off-link" refers to a network layer address that is not assigned to any interfaces on the specified link.

The address flag 158 may be a one bit autonomous address-configuration flag. Setting the address flag 158 (equal logic one) may indicate that the information in the prefix field 168 may be used for autonomous address configuration. Autonomous address configuration may be, for example, the stateless address configuration method used by IPv6.

The reserve1 field 160 may be a 6-bit unused field that may be initialized to zero by the access router 20 and ignored by the mobile node 50. The valid lifetime field 162 may be length of time in seconds (relative to the time the advertisement message is sent) that the prefix is valid for the purpose of on-link determination. The valid lifetime field 162 may be a 32-bit unsigned integer where a value of all one bits (e.g. 0xffffffff) may represent infinity.

The preferred lifetime field 164 may be the length of time in seconds (relative to the time the advertisement is sent) that addresses generated from the prefix via stateless address auto-configuration remains preferred. The preferred lifetime field 164 may also be a 32-bit unsigned integer where a value of all one bits (0xffffffff) may represent infinity. Similar to the reserved1 field 160, the reserved2 field 166 may also be an unused field that may be set to zero by the address router 20 and ignored by the mobile node 50. The prefix field 168 may include the prefix information for a network layer address of an access router 20 identified based on a link layer ID. In the presently preferred embodiments, the prefix field 168 includes the prefix of an IP address.

The COA field 134 may also be included in an advertisement message to allocate an address on behalf of a geographically adjacent access router when the IPv6 protocol is utilized. The allocated address is provided to the mobile node 50 as a care-of-address. Inclusion of the COA field 134 in the advertisement message may provide the care-of-address for use by the mobile node 50 for the duration of a handoff. Conversely, if the COA field 134 is not included in the advertisement message, the new care-of-address may be obtained by the mobile node 50 using the network layer address provided as the destination address in the advertisement message.

The cache update field 136 may also be included in an advertisement message to update information cached in the mobile node 50. Generation and transmission of the cache update field 136 in an advertisement message may be the result of an update to the cache 74 in the access router 20, a predetermined period of time, establishment of a connection point by a mobile node 50 or any other parameter associated with the access router 20.

Figure 10:
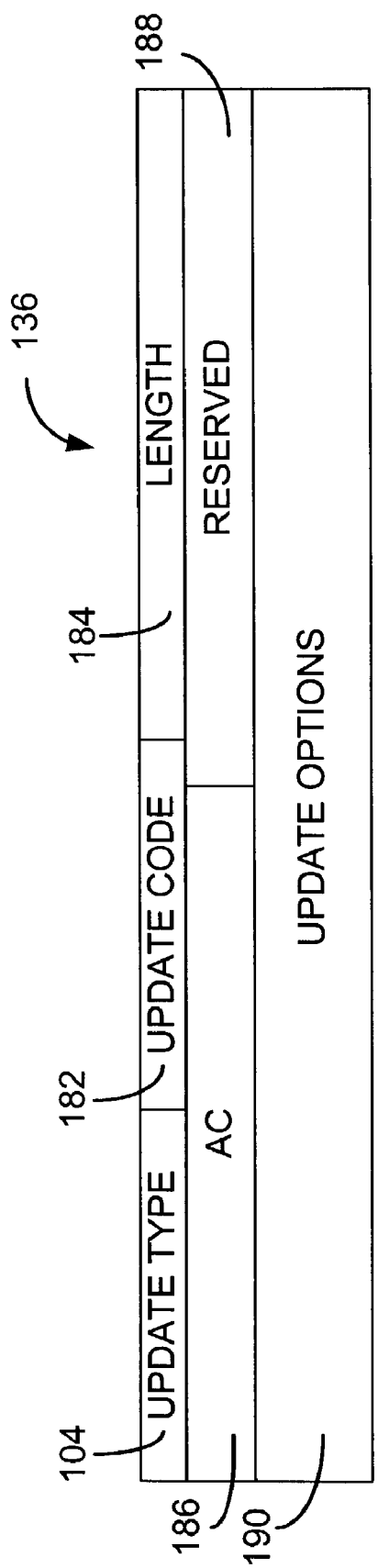
FIG. 10 is a table depicting a more detailed embodiment of a portion of the advertisement message of FIG. 8.

Referring now to FIG. 10 the illustrated embodiment of the cache update field 136 may include an update type field 180 identifying the cache update field and an update code field 182, which may preferably be zeroed. In addition, the cache update field 136 may include a length field 184, an AC field 186, a reserved field 188 and an update options field 190. The length field 184 may identify the length of the cache update field 136 by, for example the number of bytes in the field. The AC field 186 may include a predetermined value indicating the action the mobile node 50 may take upon receipt of the advertisement message containing the cache update field 136. The value in the AC field 186 may be a zero to indicate a mapped association(s) cached in mobile node 50 should be updated, and a one to indicate a mapped association(s) cached in the mobile node 50 should be removed. The reserved field 188 may be a 32-bit field that is initialized to zero by the access router 20 and may be ignored by the mobile node 50. The update options field 190 may include an access router link layer address(es).

Referring again to FIG. 3, the mobile node 50 may also include functionality to support the GAARD system 10 in the form of the GAARD mobile component 68 and the local GAARD cache component 70. The GAARD mobile component 68 may extract link layer IDs from the beacon signals and generate the solicitation messages as previously discussed. In addition, the GAARD mobile component 68 may receive and process advertisement messages sent by the access router 20. Further, the GAARD mobile component 68 may control overall functionality of the mobile node 50 with regard to the GAARD system 10. Upon receipt of an advertisement message, the GAARD mobile component 68 may cache mapped associations provided in the advertisement message with the local GAARD cache component 70.

The local GAARD cache component 70 may include a local cache 71. The local cache 71 may be used to cache mapped associations of link layer IDs and network layer addresses similar to the GAARD cache component 60 and cache 74 in the access router 20. Accordingly, upon establishment of a point of attachment, the mobile node 50 may request existing mapped associations from the access router 20 with a solicitation message. Alternatively, the access router 20 may periodically send the mobile node 50 an advertisement message in the form of a cache update message to update the contents of the GAARD cache component 60 without first receiving a solicitation message. In still other embodiments, the mobile node 50 may not include the local cache 71. In these embodiments, the mobile node 50 utilizes the cache 74 to resolve network layer addresses of network layer IDs by sending solicitation messages and receiving advertisement messages.

During operation, when a mobile node 50 receives a link layer ID via a beacon signal, the mobile node 50 first searches the local cache 71 for a mapped association with a network layer address. If mapped associations of a network layer address to the link layer ID cannot be found (e.g. the link layer ID is absent from the local cache 71), the mobile host 50 may format a solicitation message. The solicitation message may be sent to the access router 20 via the access point 18 providing the current point of attachment. The access router 20 may generate and send back an advertisement message containing the network layer address associated with the link layer ID. The mobile node 50 may add or update this information in the local cache 71. As previously discussed, the mobile node 50 may also receive a cache update from the access router 20 without making a request with a solicitation message.

Since each access router 20 may maintain a cache 74, the mapped associations in the cache 74 of any of the access routers 20 may be periodically downloaded to mobile nodes 50 with a current point of attachment with the access router 20. In order to remain synchronized, the access router 20 may format and broadcast cache updates to the mobile nodes 50 with advertisement messages. Download of the cache updates may be triggered when, for example, a cache entry in the cache 74 of the access router 20 has been changed or deleted.

Figure 11:
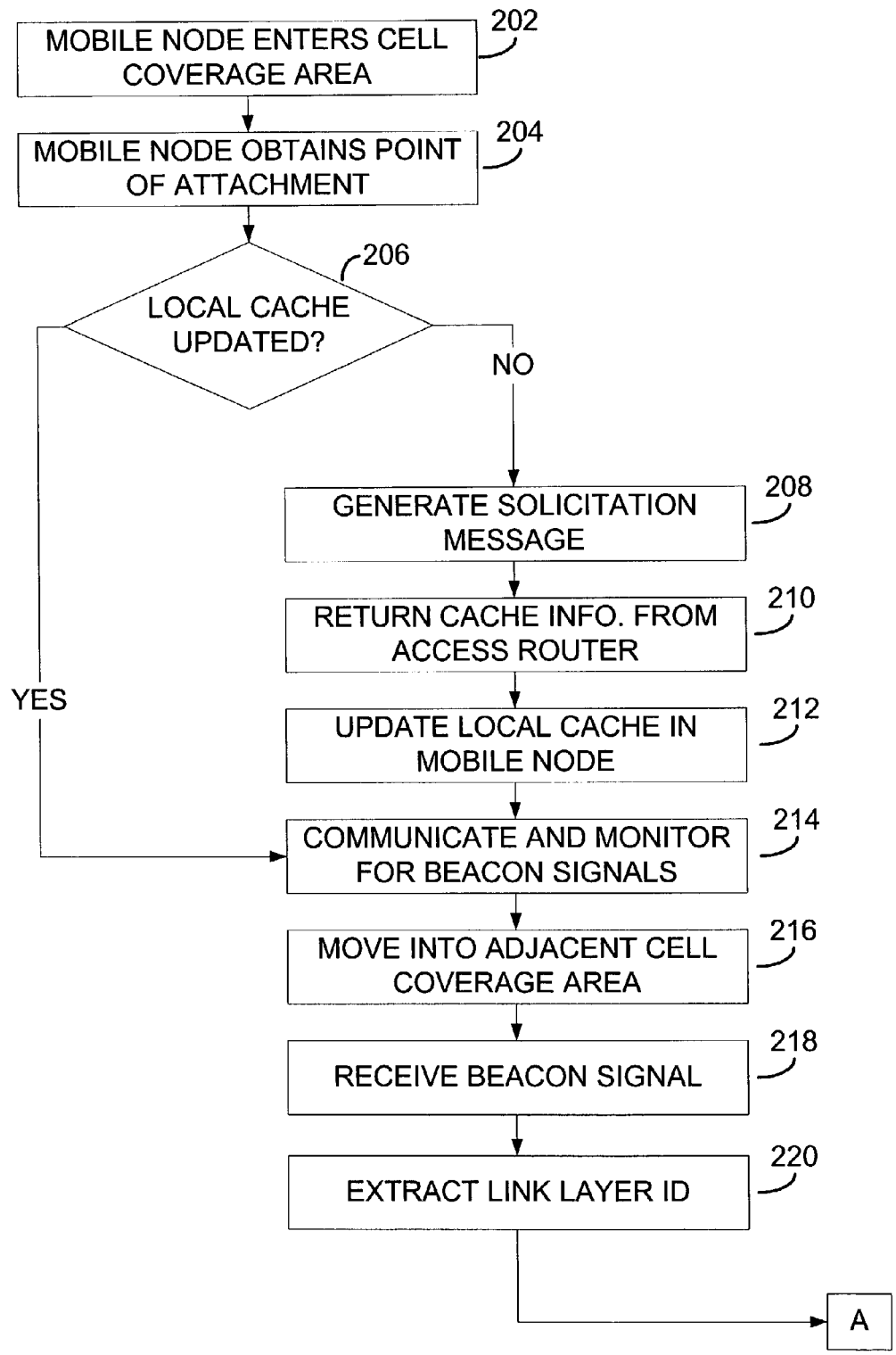
FIG. 11 is a flow diagram illustrating the operation of one embodiment of a mobile node within the GAARD system.
Figure 12:
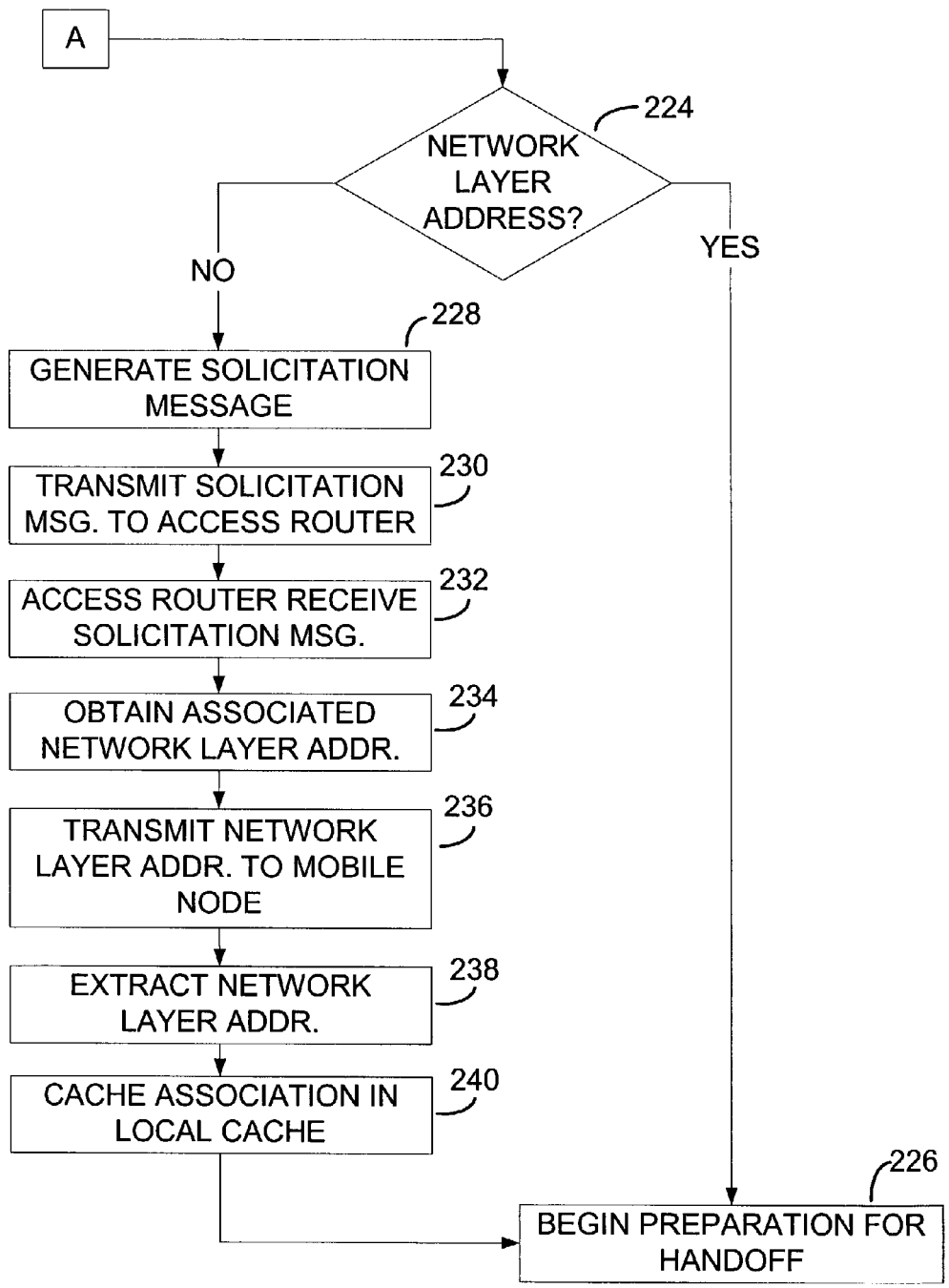
FIG. 12 is a second part of the flow diagram of FIG. 11.

FIG. 11 is an exemplary flow diagram illustrating operation of one embodiment a mobile node 50 with reference to FIGS. 2 and 3 within the GAARD system 10. At block 202, the mobile node 50 enters the cell coverage area 46 of an access point 18 in a communication system, such as, the first system 40. At block 204, the mobile node 50 obtains a point of attachment via the access point 18 with the router 20 in the first system 40.

The GAARD mobile component 68 within the mobile node 50 determines if the local cache 71 has been updated by an advertisement message from the access router 20 at block 206. If no, the GAARD mobile component 70 generates a solicitation message and sends the message to the access router 20 via the access point 18 at block 208. As previously discussed, the LL sub-type field 126 in the solicitation message is set to NULL to request all of the cached mapped associations from the access router 20. At block 210, the access router 20 may return an advertisement message to the mobile node 50 containing the cached information. The GAARD mobile component 68 processes the advertisement message and activates the local GAARD cache 70 to cache the update in the local cache 71 at block 212. At block 214, the mobile node 50 may communicate with the access router 20 while monitoring for beacon signals. If the local cache 71 has been updated by an advertisement message at block 208, the mobile node 50 communicates while monitoring for beacon signals at block 214.

At block 216, the mobile node 50 moves into the cell coverage area 46 of a geographically adjacent access point, such as the access point 18 in the second system 42. The mobile node 50 receives a beacon signal from the access point 18 in the second system 42 at block 218. At block 220, the GAARD mobile component 68 extracts the link layer ID of the access point 18 in the second system 42 from the beacon signal. The GAARD mobile component 70 determines if there is an associated network layer address mapped in the local cache 71 at block 224. If yes, at block 226, the mobile node 50 utilizes the network layer address to begin preparation for handoff.

If no associated network layer address is available from the local cache 71, the GAARD mobile component 68 generates a solicitation message at block 228. At block 230, the solicitation message is transmitted via the access point 18 to the access router 20 in the first system 40 as illustrated by arrow 76. As previously discussed, the LL sub-type field 126 within the solicitation message is set to NULL and the link layer ID from the beacon signal is included in the target LL address field 128. The access router 20 receives the solicitation message at block 232. At block 234, the access router 20 obtains the associated network layer address. The access router 20 responds to the solicitation message by transmitting an advertisement message including the associated network layer address to the mobile node 50 as illustrated by arrow 84 at block 236. As previously discussed, the advertisement message includes the network layer address within the prefix information field 132.

The advertisement message is received and processed by the GAARD mobile component 68 to extract the network layer address at block 238. At block 240, the information is cached in the local cache 71 by the local GAARD cache component 70. The operation then returns to the block 226 to begin preparation for handoff.

Figure 13:
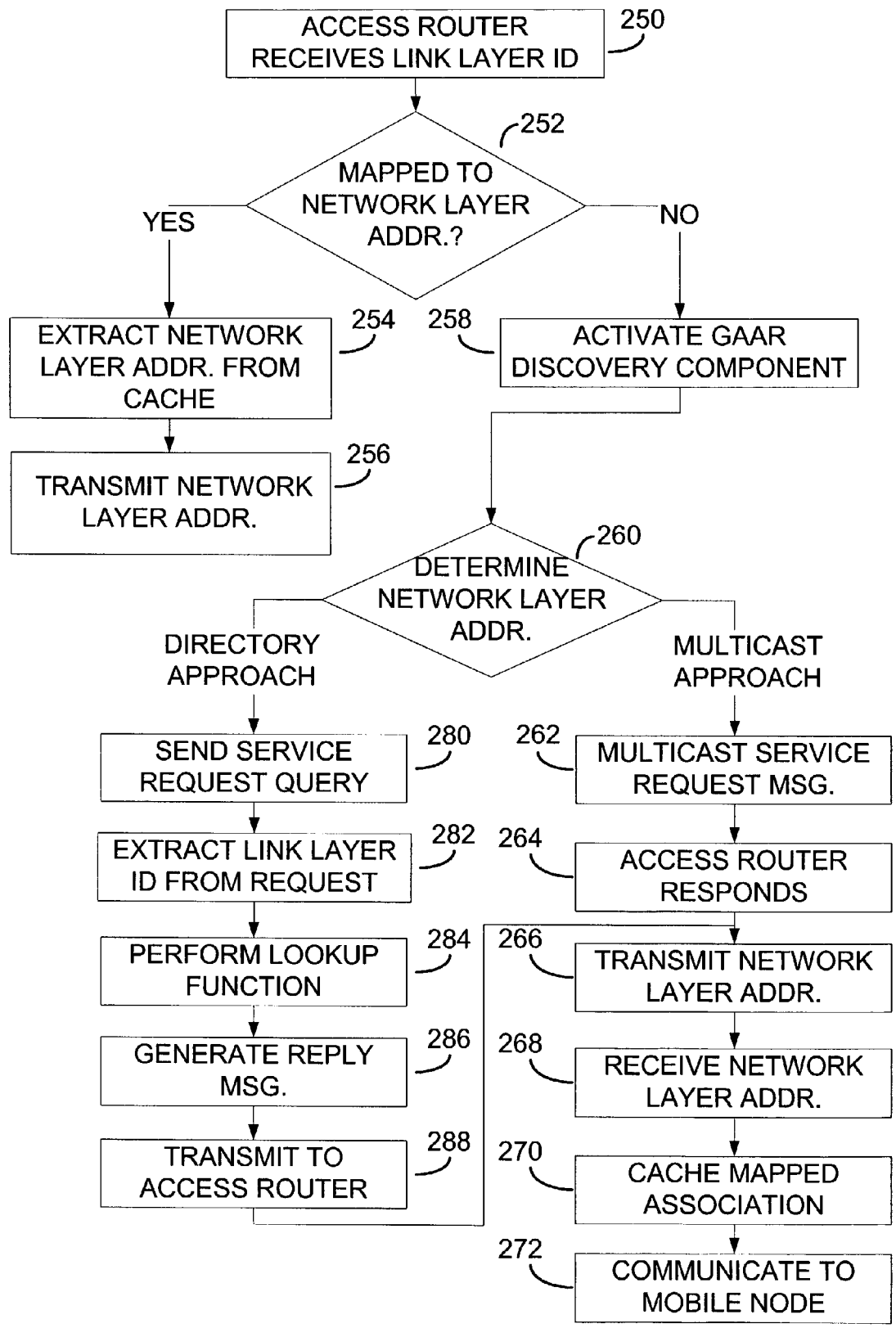
FIG. 13 is a flow diagram illustrating operation of one embodiment of an access router within the GAARD system.

FIG. 13 is an exemplary flow diagram illustrating operation of one embodiment of the access router 20 with reference to FIGS. 2 and 3. The operation begins at block 250 when the access router 20 receives a solicitation message containing a link layer ID. At block 252, the GAARD cache component 60 within the access router 20 determines if the link layer ID is mapped to a network layer address in the cache 74. If yes, the GAARD cache component 60 extracts the network layer address from the cache 74 at block 254. At block 256, an advertisement message that includes the network layer address and the associated link layer ID is generated and transmitted to the mobile node 50.

If the association mapping is not stored in the cache 74, the GAAR discovery component 62 is activated to identify the network layer address of the geographically adjacent access router (GAAR), such as the access router 20 in the second system 42 at block 258.

The GAAR discovery component 62 determines the network layer address with either the multicast approach and/or the directory approach at block 260. If the network layer address is to be found with a multicast approach, the GAAR discovery component 62 may multicast a service request message to other access routers 20 that are part of the multicast group at block 262. The service request message includes the link layer ID received in the beacon signal and transmitted in the solicitation message. At block 264, the access router 20 associated with the access point 18 whose link layer ID is included in the service request message responds to the message.

The response includes the network layer address of the responding access router 20. For example, the access router 20 in the second system 42 provides a response that includes the network layer address to indicate association with the link layer ID in the service request message. At block 266, the response is transmitted over the network 32 to the access router 20 that originated the multicast message. The GAAR discovery component 62 receives the network layer address at block 268. At block 270, the network layer address is cached in association with the link layer ID in a mapped association within the cache 74. The GAAR cache distribution component 64 communicates the network layer address to the mobile node 50 with an advertisement message at block 272.

Returning to block 260, if the directory approach is used to find the network layer address, the GAAR discovery component 62 sends a service request query to the directory server 72 at block 280. At block 282, the directory server 72 extracts the link layer ID from the service request query. The directory server 72 performs a lookup function within the database 78 at block 284. At block 286, the directory server 72 may generate a reply message containing the link layer ID and the associated network layer address obtained from the database 78. The reply message may be transmitted over the network 32 to the access router 20 at block 288. The operation then returns to block 266 and the network layer address is transmitted to the mobile node 50 as previously described.

The previously discussed embodiments of the GAARD system 10 are capable of discovering geographically adjacent access routers (GAARS) with a distributed process. The mobile nodes 50 function as mobile sensors to identify geographically adjacent access routers (GAARS). A mobile node 50 coupled via a current access point 18 with a current access router 20 may resolve the network layer address of geographically adjacent access routers (GAARS) across different subnets. The geographically adjacent access routers (GAARS) are identified based on a link layer ID within the beacon signal broadcast by the access point 18 associated with the geographically adjacent access router (GAAR). Once identified, the network layer address is mapped to the link layer ID and is cached for later use. Using the identified network layer address, the current access router 20 and mobile node 50 may prepare for a fast, efficient and seamless handover from the current access point 18 to the geographically adjacent access point 18 connected with the geographically adjacent access router (GAAR). Accordingly, the cached mapped associations have the effect of providing information about the surroundings of the current access router 20 to not only all the mobile nodes 50 currently attached, but also to those mobile nodes 50 that may become attached in the future.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of discovering geographically adjacent access routers in a communication environment in which each of a plurality of access routers are communicably coupled between a network and one or more access points to provide access to the network for one or more mobile nodes in communication using at least one access point, the method comprising:

a) receiving a link layer ID of a first access point with a mobile node that communicates with the network via a first access router and a second access point, where the second access point is different than and geographically adjacent to the first access point;

downloading cached information stored at the first access router to the mobile node, the cached information including a plurality of link layer IDs, each associated with at least one network layer address, wherein the at least one network layer address identifies a second access router; and b) identifying a network layer address of the second access router, which is geographically adjacent to the first access router, with the link layer ID, wherein the second, geographically adjacent access router is associated with the first access point that is geographically adjacent to the second access point, wherein identifying the network layer address of the second access router comprises searching the downloaded cached information using the link layer ID to identify the network layer address of the second access router.

2. The method of claim 1, wherein a) comprises entering the cell coverage area of the geographically adjacent access point.

3. The method of claim 1, further comprising the initial act of caching a mapped association of the link layer ID to the network layer address.

4. The method of claim 1, wherein the downloaded cached information includes a mapped association of the link layer ID to the network layer address.

5. The method of claim 1, wherein b) further comprises requesting the network layer address from the first access router when the link layer ID of the first access point is absent from the downloaded cached information, wherein the first access router provides the current point of attachment of the mobile node.

6. The method of claim 5, wherein b) comprises discovering the network layer address with the first access router.

7. The method of claim 1, further comprising c) preparing for a handoff of the mobile node with the network layer address of the second access router, wherein the mobile node and the first access router that provides the current point of attachment of the mobile node prepare for the handoff with the network layer address of the second access router.

8. A method of discovering geographically adjacent access routers in a communication environment in which each of a plurality of access routers are communicably coupled between a network and one or more access points to provide access to the network for one or more mobile nodes in communication with at least one access point, the method comprising:
   a) receiving a link layer ID of a first access point from a mobile node that communicates with the network via a first access router and a second access point, where the second access point is different than and geographically adjacent to the first access point;
   b) identifying a network layer address of a second access router, which is geographically adjacent to the first access router, from the link layer ID, wherein the second, geographically adjacent access router is associated with the first access point that is geographically adjacent to the second access point;
   c) caching a mapped association of the link layer ID to the network layer address, wherein the mapped association includes a plurality of link layer IDs, each associated with at least one network layer address, wherein the at least one network layer address identifies the second access router; and
   d) downloading the mapped association from the first access router to the mobile node.

9. The method of claim 8, wherein a) comprises generating a solicitation message with the mobile node that includes the link layer ID in response to receipt of a beacon signal that includes the link layer ID from the second, geographically adjacent access point.

10. The method of claim 8, wherein b) comprises querying a directory server with the link layer ID to identify the network layer address as a function of the link layer ID when the link layer ID is not present in the mapped association on the mobile node.

11. The method of claim 8, wherein b) comprises multicasting a service request message to a multicast group that includes the second, geographically adjacent access router to identify the network layer address when the link layer ID is not present in the mapped association on the mobile node, wherein the service request message includes the link layer ID.

12. The method of claim 11, wherein b) further comprises transmitting the network layer address of the second, geographically adjacent access router to the mobile node with an advertisement message that includes the link layer ID.

13. The method of claim 8, further comprising e) preparing for a handoff of the mobile node to the second, geographically adjacent access router as a function of the network layer address, wherein the mobile node and the first access router, which provides a current point of attachment of the mobile node, prepare for the handoff.

14. A method of discovering geographically adjacent access routers in a communication environment in which each of a plurality of access routers are communicably coupled between a network and one or more access points to provide access to the network for one or more mobile nodes in communication with at least one access point, the method comprising:
   a) providing a point of attachment to a mobile node with a first access router;
   b) downloading cached information from the first access router to the mobile node, the cached information including a plurality of link layer IDs each associated with at least one network layer address, wherein the at least one network layer address identifies a second access router;
   c) receiving a beacon signal with the mobile node from a geographically adjacent access point, wherein the beacon signal includes a link layer ID of the geographically adjacent access point;
   d) identifying a network layer address of the second access router associated with the geographically adjacent access point with the mobile node when the link layer ID is included in the downloaded cached information; and
   e) requesting identification of the network layer address from the second access router when the link layer ID of the geographically adjacent access point is absent from the downloaded cached information.

15. The method of claim 14, wherein e) comprises transmitting a solicitation message to the first access router that includes the link layer ID.

16. The method of claim 14, further comprising f) the mobile node and the first access router preparing for a handoff of the mobile node to the second access router with the network layer address.

17. The method of claim 14, further comprising f) transmitting the identified network layer address to the mobile node in an advertisement message.

18. The method of claim 14, wherein e) comprises querying a directory server with the first access router to identify the network layer address as a function of the link layer ID.

19. The method of claim 14, wherein e) comprises multicasting a service request message to a multicast group that includes the second access router to identify the network layer address as a function of the link layer ID.

20. The method of claim 14, wherein e) comprises accessing the cached information at the first access router to identify the network layer address as a function of the link layer ID.

21. The method of claim 14, wherein logical adjacency of the first access router and the second access router is created by the association of the link layer IDs with the at least one network layer address.

22. A system for discovering geographically adjacent access routers, the system comprising:

an access router in communication with the mobile node, wherein the access router is operable to download cached information to the mobile node, the cached information comprising a plurality of link layer IDs each associated with at least one network layer address;

a geographically adjacent access point in communication with the mobile node, the geographically adjacent access point operable to transmit a link layer ID to the mobile node; and a geographically adjacent access router in communication with the geographically adjacent access point, wherein the geographically adjacent access router is identified by a network layer address, wherein the mobile node is operable to identify the network layer address of the geographically adjacent access router as a function of the link layer ID of the geographically adjacent access point when the link layer ID is included in the cached information, and the mobile node is operable to request identification of the network layer address from the access router when the cached information does not include the link layer ID of the geographically adjacent access point.

23. The system of claim 22, further comprising a directory server, wherein the access router is operable to query the directory server for the network layer address as a function of the link layer ID.

24. The system of claim 22, wherein the access router is operable to multicast a service request to a multicast group that includes the geographically adjacent access router to identify the network layer address as a function of the link layer ID.

25. The system of claim 22, wherein the request for identification of the network layer address is a solicitation message, the solicitation message included in an IP protocol.

26. The system of claim 22, wherein the response to the request for identification of the network layer address is an advertisement message, the advertisement message included in an IP protocol.

27. The system of claim 22, wherein the mobile node comprises a GAARD mobile component and a local GAARD cache component, wherein the local GAARD cache component includes a local cache in which mapped associations of link layer IDs and network layer addresses are cached.

28. The system of claim 22, wherein the access router comprises a GAARD cache component, a GAAR discovery component and a GAARD cache distribution component, wherein the GAARD cache component includes a cache in which mapped associations of link layer IDs and network layer addresses are cached.

29. The system of claim 28, wherein the GAAR discovery component is operable to resolve the network layer address of geographically adjacent access routers for which mapped associations are absent from the cache.

30. A system for discovering geographically adjacent access routers, the system comprising:

a mobile node;

a first access router operable to provide a current point of attachment for the mobile node, wherein the first access router is to download cached information to the mobile node, the cached information comprising a plurality of link layer IDs, each associated with at least one network layer address, wherein the at least one network layer address identifies a second access router;

the second access router geographically adjacent to the first access router, wherein the first access router is unaware of the geographic adjacency of the second access router; and a geographically adjacent access point associated with the second router, wherein the geographically adjacent access point is operable to transmit a link layer ID of the geographically adjacent access point to the mobile node, wherein the mobile node is operable to resolve the at least one network layer address of the second access router from the link layer ID when the link layer ID is included in the cached information.

* * * * *